US012580885B2

(12) United States Patent
Bouvet

(10) Patent No.: US 12,580,885 B2
(45) Date of Patent: Mar. 17, 2026

(54) METHOD AND DEVICE FOR DETECTING THE USE OF AN UNCERTIFIED DOMAIN NAME SERVER

(71) Applicant: Orange, Issy-les-Moulineaux (FR)

(72) Inventor: Bertrand Bouvet, Chatillon Cedex (FR)

(73) Assignee: Orange, Issy-les-Moulineaux (FR)

( * ) Notice: Subject to any disclaimer, the term of this patent is extended or adjusted under 35 U.S.C. 154(b) by 367 days.

(21) Appl. No.: 17/908,083

(22) PCT Filed: Feb. 26, 2021

(86) PCT No.: PCT/FR2021/050338
§ 371 (c)(1),
(2) Date: Aug. 30, 2022

(87) PCT Pub. No.: WO2021/176166
PCT Pub. Date: Sep. 10, 2021

(65) Prior Publication Data
US 2023/0094785 A1 Mar. 30, 2023

(30) Foreign Application Priority Data
Mar. 3, 2020 (FR) ...................................... 2002111

(51) Int. Cl.
*H04L 9/40* (2022.01)

(52) U.S. Cl.
CPC ...... *H04L 63/0236* (2013.01); *H04L 63/1416* (2013.01); *H04L 63/1425* (2013.01)

(58) Field of Classification Search
CPC ............. H04L 63/0236; H04L 63/1416; H04L 63/1425
See application file for complete search history.

(56) References Cited

U.S. PATENT DOCUMENTS 6,442,602 B1 * 8/2002 Choudhry ........... H04L 61/4511
370/252
2004/0250119 A1 * 12/2004 Shelest ................... H04L 63/08
726/4
(Continued)

FOREIGN PATENT DOCUMENTS

EP 3591932 A1 * 1/2020 ........... H04L 45/748

OTHER PUBLICATIONS

International Search Report dated May 19, 2021 for corresponding International Application No. PCT/FR2021/050338, filed Feb. 26, 2021.
(Continued)

*Primary Examiner* — William S Powers
(74) *Attorney, Agent, or Firm* — David D. Brush; Westman, Champlin & Koehler, P.A.

(57) ABSTRACT

A method and a device for notification, by a notification device, of the use by at least one terminal of an uncertified domain name server. The method includes: receiving a request from the at least one terminal, the request comprising at least one parameter corresponding to a first address enabling communication with a server; searching for the first address in a list, the list comprising at least one address obtained from at least one certified domain name server; and notification, according to the search result, of the use by the at least one terminal of an uncertified domain name server.

15 Claims, 1 Drawing Sheet

(56)  References Cited

U.S. PATENT DOCUMENTS

| 2014/0282816 | A1* | 9/2014 | Xie | .......................... | H04L 67/06 |
| | | | | | 726/1 |
| 2017/0055302 | A1* | 2/2017 | Wang | .................... | H04W 76/12 |
| 2020/0007548 | A1* | 1/2020 | Sanghavi | .............. | H04L 63/101 |

OTHER PUBLICATIONS

Written Opinion of the International Searching Authority dated May 19, 2021 for corresponding International Application No. PCT/FR2021/050338, filed Feb. 26, 2021.

English translation of the Written Opinion of the International Searching Authority dated May 28, 2021 for corresponding International Application No. PCT/FR2021/050338, filed Feb. 26, 2021.

* cited by examiner

[Fig 1]
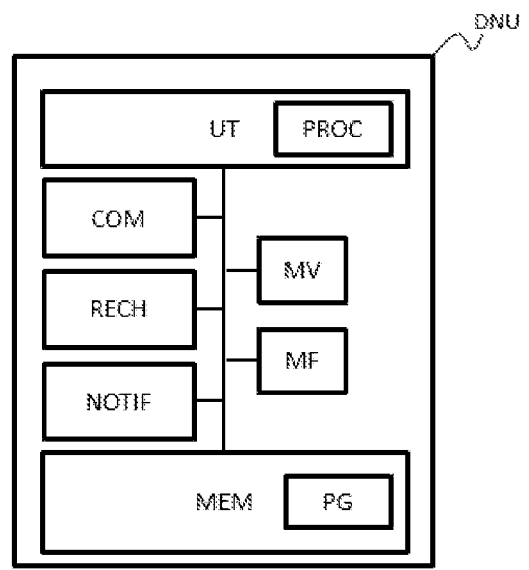
[Fig 2]
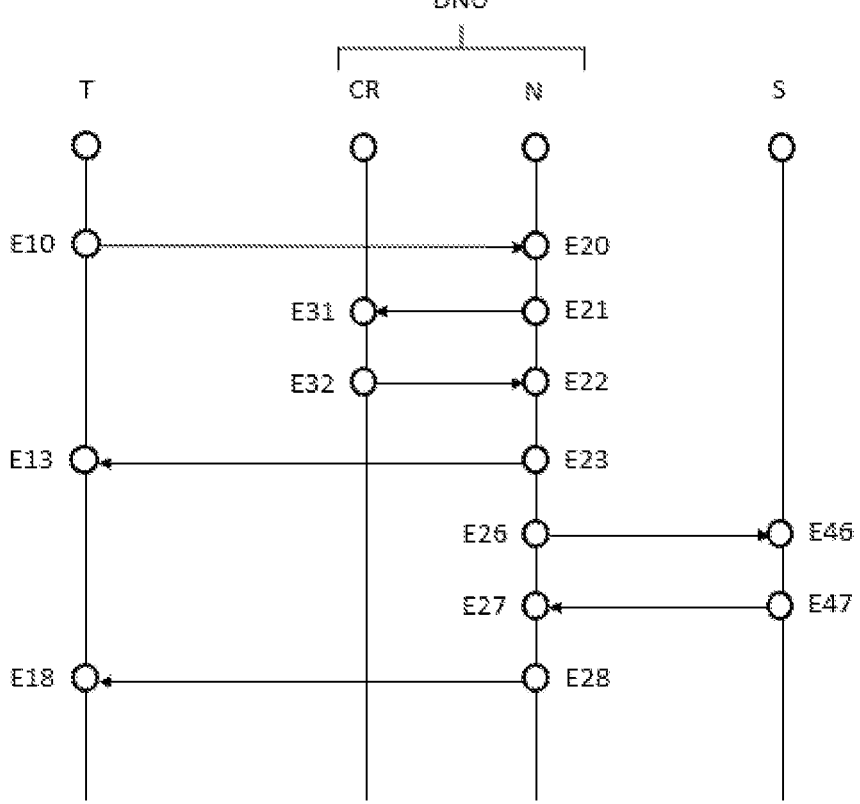

METHOD AND DEVICE FOR DETECTING THE USE OF AN UNCERTIFIED DOMAIN NAME SERVER

CROSS-REFERENCE TO RELATED APPLICATIONS

This Application is a Section 371 National Stage Application of International Application No. PCT/FR2021/050338, filed Feb. 26, 2021, which is incorporated by reference in its entirety and published as WO 2021/176166 A1 on Sep. 10, 2021, not in English.

1. FIELD OF THE INVENTION

The invention relates to the general field of telecommunications networks, and more particularly to DNS technology (DNS standing for Domain Name System).

2. PRIOR ART

When a user wishes to access an Internet site, such as for example a web shop, he will conventionally use an Internet browser present on his terminal. To access the web shop, the browser or the terminal may interrogate a domain name server, also called a DNS server, in order to find a match between the URL (Uniform Resource Locator) of the web shop, which is for example entered by the user, and the IP address of the server hosting it (IP standing for Internet Protocol). This mechanism is called "DNS resolution". Specifically, over the Internet, it is the IP address that is used to communicate between different terminals of the network.

The messages exchanged with DNS servers are messages that are said to be "in the clear", i.e. that are unencrypted. This feature allows Internet service providers operating DNS servers to offer their customers additional services such as parental-control services or services detecting malicious Internet sites. In concrete terms, these services are based on the URLs for which a match with an IP address is requested, and for example permit the URL to be filtered or a specific message to be sent to the client.

For a number of years, certain parties have been providing public DNS servers, replacing those historically provided by Internet service providers. At the present time, nearly 50% of DNS resolutions are carried out via these public DNS servers. This percentage is increasing with the increased use of secure DNS protocols such as DoH (DNS over HTTPS with RFC IETF 8484) or DoT (DNS over TLS). Specifically, some Internet browsers allow these protocols to be used with by default possible configuration by its user of a public DNS server.

If these public DNS-resolution services are in certain cases relevant to users (better response time claimed for example for on-line games, encryption of DNS requests and responses for better security, etc.), they do however lead to the loss of certain services offered by Internet service providers. Specifically, since the Internet service provider's DNS servers are not used by user terminals, services based on DNS resolutions, such as parental control, will no longer work. This may, for example, generate user dissatisfaction and significant after-sales service costs for Internet service providers. Specifically, it may be quite difficult for a help-desk representative to determine that the problem stems from the use of a public DNS server by a terminal or an application executed on the terminal.

More generally, the use of these public DNS servers may also lead to an increase in international IP traffic. Specifically, these public DNS servers, which for the most part are hosted in the United States, prevents use of a local "DNS cache" (DNS cache is a memory that stores resolved "domain name—IP address" pairs in order that they may be found more quickly), such a cache for example being provided within the network of an Internet service provider, and therefore to all of its customers, or indeed within a domestic gateway of an Internet service provider, and therefore to all the terminals and applications managed thereby; however, use of DNS cache would make it possible to achieve a substantial decrease in DNS traffic and a lower energy/environmental impact. The use of public DNSs also causes problems with the protection of personal data. A malicious party offering such a service could collect sensitive user data and sell it on without users being aware of it.

3. SUMMARY OF THE INVENTION

The invention improves the state of the art and provides, to this end, a method for providing notification, by means of a notification-providing device, of the use, by at least one terminal, of an uncertified domain name server, the method being characterized in that it comprises:-a a step of receiving a request from said at least one terminal, said request comprising at least one parameter corresponding to a first address allowing communication with a server;

a step of searching for said first address in a list, said list comprising at least one address obtained from at least one certified domain name server;

a step of providing notification, depending on the result of the search, of the use, by said at least one terminal, of an uncertified domain name server.

Advantageously, according to the invention, the method will be able to detect the use, by a terminal of a user, of an uncertified domain name server. Upon receipt of a request sent by the terminal, the method will verify that a DNS resolution has indeed been performed by a certified DNS server. To this end, the method will retrieve, from the received request, a parameter such as the address of the recipient server, and verify that this address is present in a list comprising addresses provided to the terminal by certified DNS servers. This list is for example filled as DNS resolutions occur. If the address of the recipient server is not present in the list, then the method will generate a notification indicating that the terminal is using an uncertified domain name server. If it is present in the list, it means that the DNS resolution has been performed by a certified DNS server and no notification is generated. It should be noted that this method is applicable regardless of the DNS protocol used, even for the DoH/DoT protocols, in which the DNS exchanges between the terminal and an uncertified DNS server are encrypted end-to-end using the HTTPS/TLS protocol.

By certified DNS server, what is meant is domain name servers that are said to be "trusted", which servers are selected by an authorized organization such as, for example, the Internet service provider of the user of the terminal. Of course, the selection criteria regarding the notion of trust may be specific to each organization. Thus, the certified DNS servers may differ depending on the organization.

By list what is meant is a sequence of optionally ordered, optionally separate elements allowing a structured set to be obtained, i.e. a set such as a list of elements, timestamped elements for example, of IP addresses, of domain names, of MAC addresses, of port numbers or indeed of protocols.

This list is for example a DNS cache able to store "domain name-IP address" pairs resolved for a terminal or the applications executed on the terminal.

By address what is meant is a sequence of characters and/or of binary data that serve to identify a terminal or one of its electronic modules such as, for example, a server, a home gateway, a smart phone, a computer, a connected object, a network card or any other terminal connected to a network, such as a URI for example.

By server what is meant is any terminal connected to a network, such as an Internet server, a smart phone, a computer, a connected object, etc.

By terminal what is meant is any terminal connected to a network or any application being executed on a terminal able to communicate with another terminal.

By request what is meant is any message sent by a terminal or by an application being executed on a terminal to a server, such as for example an HTTP message, an IP packet, etc.

By domain name server what is meant is a DNS server (DNS standing for Domain Name System) or a so-called "DNS Resolver" that includes means for periodically consulting DNS root servers (.org, .com, .net, etc.) and servers that are under the administrative control of various entities (companies, states, associations, etc.) as well as DNS caching means.

According to one particular embodiment of the invention, a method such as described above is characterized in that the searching and notification-providing steps are conditional on the result of a second step of searching for said at least one first address in a second list, said second list comprising the destination addresses of the requests sent by said at least one terminal.

Advantageously, this embodiment allows the searching and notification-providing steps to be made dependent on the presence, in a list, of the destination address of the request sent by the terminal of the user. This list may for example be a list of IP addresses already known to a home gateway such as a NAT table (NAT standing for Network Address Translation) or NAPT table (NAPT standing for Network Address Port Translation) in the case of the use of the IPV4 protocol or even an IPV6 packet routing table. It may also be, for example, an NAPT table of a piece of CGN network equipment (CGN standing for Carrier Grade NAT) performing an IPV4-IPV6 tunnel function.

This embodiment of the invention also makes it possible to verify whether the destination address of the request sent by the terminal of the user, such as for example an IP address, is present in a list stored in a digital storage space such as a database, a file, or a memory. The digital storage space may for example store data related to uncertified public DNS servers (blacklist).

According to one particular embodiment of the invention, a method as described above is characterized in that the searching step further comprises searching for a second address associated with said first address in said first list, said second address being a parameter of said request and corresponding to an address of said at least one terminal, said first list comprising at least one address of said at least one terminal, which at least one address is obtained from said at least one terminal, said at least one address being associated with at least one address obtained from said at least one certified domain name server.

Advantageously, this embodiment makes it possible to take into account the case where a plurality of terminals are managed by the notification-providing device and where, for example, one of them uses an uncertified DNS server.

Specifically, the resolution of a domain name could have been performed by a certified DNS server on behalf of one of the terminals before a similar request was made by the terminal using the uncertified DNS server. Consequently, there will be, in the list, the address of the server corresponding to the domain name sought by the terminal using the uncertified DNS server. The address of the server is therefore, in this case, insufficient to detect the use of an uncertified DNS server. To do this, a second address such as a MAC address or an IP address or a unique IMEI identifier (IMEI standing for International Mobile Equipment Identifier) associated with the terminal is necessary. Thus, this second address makes it possible to find the DNS resolutions of one particular terminal in the list.

According to one particular embodiment of the invention, which will possibly be implemented alternatively or cumulatively with the previous one, a method such as described above is characterized in that the searching step further comprises searching for at least one communication-port number associated with said address in said first list, said at least one communication-port number corresponding to a parameter of said request, said first list comprising at least one communication-port number obtained from said at least one terminal associated with at least one address obtained from said at least one certified domain name server.

Advantageously, this embodiment makes it possible to take into account the case where a plurality of applications are being executed on the terminal of the user with, for example, one of them using an uncertified DNS server. Specifically, the resolution of a domain name could have been performed by a certified DNS server before a similar request was made by the application using the uncertified DNS server. Consequently, there will be, in the list, the address of the server corresponding to the domain name sought by the application using the uncertified DNS server. The address of the server is therefore, in this case, insufficient to detect the use of an uncertified DNS server. To do this, the number of the source communication port corresponding to the application using the uncertified DNS server is necessary. Specifically, in the case of a TCP/IP communication, the TCP/IP stack of the terminal cannot assign the same source port number to various applications at the same time, as if it did the TCP/IP stack would not know to which application to route incoming IP traffic. The method may thus provide notification of the use by an application of the terminal of an uncertified DNS server.

According to one particular embodiment of the invention, a method such as described above is characterized in that the notification-providing step comprises a redirection of said request to at least one Internet page.

This mode of implementation of the invention makes it possible to inform the user via the display of a web page on his terminal that he is using an uncertified domain name server with the associated risks.

According to one particular embodiment of the invention, a method such as described above is characterized in that the notification-providing step comprises sending a message to said first terminal.

This mode of implementation of the invention makes it possible to inform the user via for example an SMS, an RCS message, an email or a notification message sent for example by virtue of an FCM solution (FCM standing for Firebase Cloud Messaging) that he is using an uncertified domain name server with the associated risks.

According to one particular embodiment of the invention, a method such as described above is characterized in that the notification-providing step comprises sending a message to a help desk.

This mode of implementation of the invention makes it possible, for example, to inform the customer-service department of the Internet service provider of the user of the first terminal that he is using an uncertified DNS server. The customer-service representative will then more easily be able to understand the origin of a malfunction observed by the user in one of the services thereof based on DNS resolutions, such as parental control, and to help the user solve the problem.

According to one particular embodiment of the invention, a method such as described above is characterized in that the notification-providing step is followed by a step of filtering requests originating from said first terminal.

This embodiment of the invention makes it possible, when the user of the first terminal uses an uncertified DNS server, to filter requests sent by the first terminal. The filtering may be partial or complete, i.e. the filtering may block all requests or let some of them pass, such as for example those intended for the on-line help desk of the Internet service provider of the user of the first terminal. The filtering may also correspond to putting requests on hold for a period (for example one second) causing for example Internet flows to/from the first terminal to slow down.

According to one particular embodiment of the invention, a method such as described above is characterized in that the notification-providing step is followed by a step of modifying requests sent by said first terminal.

This embodiment of the invention makes it possible, for example, when the user of the first terminal uses an uncertified DNS server, to "mark" requests sent by the first terminal. The network equipment that receives these requests may then apply specific processing rules such as, for example, rules indicating that they must be counted, ignored, blocked, routed in a specific way, or even that traffic duplication must be applied.

The invention also relates to a device for providing notification of the use by a first terminal of an uncertified domain name server, and characterized in that the device comprises:
- a module for receiving a request from said at least one terminal, said request comprising at least one parameter corresponding to a first address allowing communication with a server;
- a module for searching for said first address in a list, said list comprising at least one address obtained from at least one certified domain name server;
- a module for providing notification, depending on the result of the search, of the use by said at least one terminal of an uncertified domain name server.

The term module may correspond equally to a software component or to a hardware component or to a set of software and hardware components, a software component itself corresponding to one or more computer programs or subroutines or, more generally, to any element of a program able to implement a function or a set of functions such as described for the modules in question. In the same way, a hardware component corresponds to any element of a hardware assembly able to implement a function or a set of functions for the module in question (integrated circuit, chip card, memory card, etc.).

The invention also relates to a gateway characterized in that it comprises a device for providing notification of the use by a first terminal of an uncertified domain name server.

By gateway what is meant is a device making it possible to connect two computer networks of different types, such as for example a local-area network and an Internet network, i.e. a device such as a modem-router, a mobile telephone with the "connection sharing" activated, etc.

The invention also relates to a server characterized in that it comprises a device for providing notification of the use by a first terminal of an uncertified domain name server.

The invention also relates to a terminal characterized in that it comprises a device for providing notification of the use by a first terminal of an uncertified domain name server. Advantageously, this embodiment makes it possible to take into account the case where the terminal has, for example, a DNS cache.

The invention also relates to a computer program comprising instructions for implementing the above method according to any one of the particular embodiments described above when said program is executed by a processor. The method may be implemented in various ways, in particular in hard-wired form or in the form of software. This program may use any programming language and be in the form of source code, object code or intermediate code between source code and object code, such as in a partially compiled form, or in any other desirable form.

The invention also targets a computer-readable recording medium or information medium containing instructions of a computer program such as mentioned above. The above-mentioned recording media may be any entity or device capable of storing the program. For example, the medium may comprise a storage means, such as a ROM, for example a CD-ROM or a microelectronic circuit ROM, or else a magnetic recording means, for example a hard disk. Moreover, the recording media may correspond to a transmissible medium such as an electrical or optical signal, which may be routed via an electrical or optical cable, by radio or by other means. The programs according to the invention may in particular be downloaded from an Internet network.

As an alternative, the recording media may correspond to an integrated circuit in which the program is incorporated, the circuit being designed to execute or to be used in the execution of the method in question.

This device for providing notification of the use by a first terminal of an uncertified domain name server and this computer program have features and advantages similar to those described above in relation to the method for providing notification of the use by a first terminal of an uncertified domain name server.

4. LIST OF THE FIGURES

Other features and advantages of the invention will become more clearly apparent on reading the following description of particular embodiments, which are provided by way of simple illustrative and nonlimiting examples, and of the appended drawings, in which:

FIG. 1 shows the hardware architecture of a device for providing notification of the use by a first terminal of an uncertified domain name server;

FIG. 2 presents in the form of a flowchart the main steps of a method for providing notification of the use by a first terminal of an uncertified domain name server.

5. DESCRIPTION OF ONE EMBODIMENT OF THE INVENTION

FIG. 1 shows the hardware architecture of a device DNU for providing notification of the use by a first terminal of an uncertified domain name server according to the invention. In the embodiment described here, this device has the hardware architecture of a computer. It in particular comprises a processor PROC, a random-access memory MV, a read-only memory MEM and a non-volatile flash memory MF. Such means are known per se and are not described in more detail here. The ROM is a storage medium according to the invention, which is readable by the processor PROC and on which is here stored a computer program PG according to the invention, this program comprising instructions for implementing the steps of the method for providing notification of the use by a first terminal of an uncertified domain name server such as described above, when the program is executed by the processor PROC.

On initialization, the code instructions of the computer program PG are for example loaded into a memory, before being executed by the processor PROC. The processor PROC of the processing unit UT in particular implements the steps of the method for providing notification of the use by a first terminal of an uncertified domain name server according to any one of the particular embodiments described with reference to FIG. 2, according to the instructions of the computer program PG. The device DNU comprises a communication module COM configured to set up communications with, for example, an IP network. This communication module COM is used to receive requests from a terminal of a user. This terminal is for example a smart phone, a computer, a tablet, the on-board computer of a connected automobile or a connected object (IoT, which stands for Internet of Things) or any terminal able to connect to a network, to the Internet for example. Thus, on receipt of the request by the module COM, the method will retrieve a parameter, such as for example an address, such as an IP address or a MAC address, a communication-port number or a transport protocol, which allows communication with a second terminal, such as an Internet server, hosting services and/or web pages.

The device DNU in addition comprises a module RECH that will search for the received address in a list, which is for example stored in a database, a file, or a memory. The device further comprises a module NOTIF capable of providing notification that a terminal is using an uncertified domain name server if, for example, the received address is not in the list.

According to one particular embodiment of the invention, the module RECH may also be used to search for the received address in a list comprising the addresses of uncertified domain name servers (blacklist). If the address is present in the list then the terminal of the user is using an uncertified domain name server. A notification will then possibly be sent by the device indicating the use by the user terminal of an uncertified domain name server.

According to one particular embodiment of the invention, the device may comprise a human-machine interface allowing the notification to be given to the user visually or vocally.

According to one particular embodiment of the invention, the module RECH may also be used to search for the received address in an NAT or NAPT list in the case of an IPV4 packet or else in an IPV6 packet routing list that is for example hosted within a gateway or more generally a fixed/mobile network access point.

According to one particular embodiment of the invention, the module COM may be used to send the notification to a terminal such as, for example, the terminal of the user. The notification may also be sent internally to the machine hosting the device, for example to a second communication module such as a second network card.

According to one particular embodiment of the invention, the device comprises a database configured to store data such as a source IP address, a source port, the transport protocol, the destination IP address and the destination port requests sent and received by the module COM.

According to one particular embodiment of the invention, the device comprises a second database configured to store data related to uncertified domain name servers (black list) or data linked to certified domain name servers (white list).

With reference to FIG. 2, we will now describe the main steps of a method for providing notification of the use by a first terminal of an uncertified domain name server.

FIG. 2 shows a terminal T able to send and receive requests to and from the device DNU, and a server S able to process the requests sent by the terminal T via the device DNU. In the example described with reference to FIG. 2, the device DNU executing the method for providing notification of the use, by a first terminal, of an uncertified domain name server is a gateway supporting the IPv4 protocol, the server S is an uncertified domain name server and the terminal T is for example a smart phone, a computer, a tablet or a connected object (IoT for Internet of Things) located in the local-area network managed by the gateway DNU.

In step E10 an application executed on the terminal T sends a DNS-resolution request to the server S, the destination IP address of the request being the IP address of the server S. In step E20 the request is received by the gateway via its communication module COM. Since the destination IP address does not correspond to its IP address space, i.e. to the IP addresses generated for terminals located locally and managed by the gateway via a DHCP module for example, the request is redirected to a module N of the gateway. The module N makes it possible, for example, to store, in a table or a list located in a memory, a file or a database for example, data such as the source IP address of a request coming from a terminal, i.e. the IP address used within the local-area network by the terminal that sent the request, the source port number contained in the sent request and associated with the application, the transport protocol used by the request (UDP, TCP, SCTP, etc.), the destination IP address (the IP address of the uncertified DNS server) and the destination port number contained in the request.

According to one particular embodiment, the method may make passage to step E21 conditional on the presence of the destination IP address in the table managed by the module N. If said address is present, the method then passes to step E26.

In step E21, the method will search in a list located for example in a memory, a file or a database of the gateway, for the destination IP address of the request. This list is for example a DNS cache (CR) storing all the DNS-resolution requests that have been made to certified DNS servers by terminals located in the local-area network of the gateway. This search may for example be carried out via a "Who is Lookup" with the IP address of the server S as a parameter.

In step E31, the DNS cache (CR) retrieves the search result and sends it to the module N in step E32. The result is then retrieved and processed by the module N in step E22.

In the case where the IP address of the server S is present in the DNS cache, this means that the application has used the FQDN address of the server S to contact it (FQDN stands for Fully Qualified Domain Name). This also indicates that a DNS resolution has previously been carried out by a certified domain name server such as, for example, the domain name server used by the terminal itself. The method then passes to step E26. It will be noted that, in this case, particular processing of the request, such as filtering for parental control purposes, could have been carried out beforehand by the certified domain name server.

In the case where the IP address of the server S is not present in the DNS cache, this means that no DNS resolution via a certified domain name server has returned the IP address of the server S. In other words, the IP address was retrieved by the application via an uncertified domain name server. It may also mean that the IP address of the uncertified DNS server is known to the application and in this case DNS resolution is not necessary.

According to one particular embodiment of the invention, the method may, if the request is for example an HTTP/HTTPS request, pass to step E23. The process will then generate an HTTP/HTTPS redirect request via a standardized response code of the 3xx series. The redirect address may for example be the address of an information web page hosted on an Internet server or in the gateway. This web page thus allows the user to be provided with notification of the use by the application of an uncertified DNS.

It will be noted that the user may, after consulting the information web page, deactivate the notification of the use of an uncertified DNS and/or the redirection via, for example, a parameter of the gateway accessible via a dedicated web page.

According to a first variant of this particular embodiment of the invention, the method may pass to step E23 depending on a number of requests made to the server S. In other words, redirection is activated depending on a number of requests made to the server S. For example, every n (10 for example) requests, redirection is activated, then deactivated on request n+1. If redirection is deactivated then the method passes directly from step E22 to step E26.

According to a second variant of this particular embodiment of the invention, if the application remakes a request to the server S then redirection may be deactivated for a predetermined period (for example one day/one week/one or more months). If redirection is deactivated then the method passes directly from step E22 to step E26.

According to one particular embodiment of the invention (not shown here), which may be implemented alternatively to or cumulatively with the previous one, a message giving information on the gateway and/or the terminal T executing the application configured to use an uncertified domain name server, is sent to a server, such as for example a server of the Internet service provider of the user of the terminal T. This message makes it possible to provide notification to a third party of the use of an uncertified DNS by the application. The message may contain all kinds of data such as the day, the date, the MAC address of the terminal and/or of the gateway, the IP address assigned to the terminal on the local-area network, the IP address assigned to the gateway by the Internet service provider, the IP address of the server S, etc.

According to one particular embodiment of the invention (not represented here), which may be implemented alternatively or cumulatively with the previous ones, the notification of the use of an uncertified DNS by the application is rendered via a human-machine interface of the gateway. This interface is for example a diagram showing the terminals present in the local-area network managed by the gateway. The diagram may be viewed for example via a screen located on the gateway, or via an Internet browser of a terminal connected to the gateway, via which a web page generated by a web server running on the gateway is displayed.

According to one particular embodiment of the invention, the method may filter requests sent by the terminal T subsequent to the request sent in step E10. This filtering may be partial or complete, i.e. the filtering may block all requests or let some of them pass, such as those intended for the on-line help desk of the Internet service provider of the user of the terminal T. The filtering may also correspond to putting requests on hold for a period (for example one second) so as for example to cause Internet flows to/from the terminal T to slow down.

According to one particular embodiment of the invention, the method may modify the requests sent by the terminal T subsequent to the request sent in step E10 and intended for Internet servers. The modification may for example consist in "marking" all of the requests sent by the terminal or only the requests sent by the application. Marking may for example be achieved via:

use of the 1st unused bit of the 3 bits of the "Indicator" field of the header of the IPv4 packet corresponding to the request;

use of one of the 2 unused bits of the IPv4 "Type of service" header;

creation of a new IPv4 public DNS option. For example it is possible to use an option class reserved for future use (classes 1 and 3) and to create a "public DNS" option in one of these classes or create the "public DNS" option in one of the existing classes, classes 0 or 2. The "public DNS" option may for example be coded in option number 10 of option class 0 in TLV format (TLV standing for Type, Length, Value).

Thus, servers and/or routers that receive marked requests will be able to apply specific processing rules to these requests, such as, for example, rules indicating that they must be counted, ignored, blocked, routed in a specific way, that specific quality-of-service policies must be implemented in regard thereto, or even that they must be duplicated.

In step E26, the method will modify the request, replacing the source IP address of the terminal with the IP address of the gateway, i.e. the IP address given to the Internet gateway by a DHCP server of the Internet service provider and allowing communication with other terminals connected to the Internet. Optionally the source communication-port number, i.e. of the terminal T, present in the request may also be modified in step E26. The request is then sent to the server S and is received by the latter in step E46. As is known, the response follows the reverse path (E47, E27, E28) and is received in step E18 by the terminal T.

According to one particular embodiment of the invention, the method may, in step E21, perform a search with, as parameters, the destination IP address of the request and the MAC address and/or the IP address of the terminal T. This embodiment makes it possible to allow for the case where a plurality of terminals are present in the local-area network managed by the gateway DNU. Specifically, the MAC address and/or the IP address will make it possible to determine the terminal that requested a DNS resolution from a certified domain name server, and to ensure, if a DNS resolution has been previously stored in the cache CR for this IP address, that it was indeed requested by this terminal and not another. Obviously, this assumes that the MAC address and/or the IP address of the terminal requiring DNS resolution is saved and associated with the DNS resolution in the cache CR before step E21, for example when the DNS-resolution request is made.

According to one particular embodiment of the invention, which may be implemented alternatively or cumulatively with the previous one, the method may, in step E21, perform a search with, as parameters, the destination IP address of the request and the source communication-port number used by an application of the terminal T to communicate. This embodiment makes it possible to allow for the case where a plurality of applications able to request DNS resolutions are being executed on the terminal T. Specifically, the source communication-port number will make it possible to determine the application that made a DNS-resolution request to a certified domain name server and to ensure, if a DNS resolution has been previously stored in the cache CR for this IP address, that it was indeed requested by this application of the terminal T and not another application of the same terminal T. Obviously, this assumes that the source communication-port number of the application that required DNS resolution is saved and associated with the DNS resolution in the cache CR before step E21, for example when the DNS-resolution request is made. Alternatively or cumulatively, the method may also use, as a search parameter in step E21, the destination communication-port number of the request and/or the transport protocol used and/or any datum present in the message E10, such as a datum of IP version 3 or higher.

It goes without saying that the embodiment that has been described above has been given purely by way of wholly nonlimiting indication, and that numerous modifications may easily be made by those skilled in the art without, however, departing from the scope of the invention. According to other particular embodiments of the invention, the invention also applies to a gateway using an IPv6 protocol. In this case, the module N corresponds to an IPV6 packet routing module of the gateway. It will be noted that, in this particular embodiment, the "Next Header" extension fields of the IPv6 protocol header may be used to mark IP requests/packets originating from terminals or applications using an uncertified domain name server.

Marking may also be achieved via an "Options" field of the "Hop-by-Hop Options" header or "Destination Options" header, for example using TLV coding.

According to another embodiment of the invention, the invention is also applicable to a mobile access point, for example to a 4G or 5G smart phone playing the role of WiFi access point for one or more terminals.

According to another embodiment of the invention, the invention is also applicable to a terminal, for example a fixed or mobile terminal, provided with a DNS cache function.

According to another particular embodiment of the invention, the invention is also applicable to a 4G/5G mobile core network implemented using PGW equipment (PGW standing for Packet GateWay) in the case of a 4G core network, or SMF/UPF equipment in the case of a 5G core network (SMF/UPF standing for Session Management Function/User Plane Function). The method is the same as the one described with reference to FIG. 2.

Specifically, the PGW or SMF/UPF equipment may incorporate a DNS cache CR that operates identically to the one presented above. Therefore, the same method may be employed. On each new detected flow or IP request, a request, for example a "Whois Lookup", may be sent by the module for processing IP traffic of the PGW or SMF/UPF equipment, i.e. the module N, to the DNS cache CR of the PGW or SMF/UPF equipment (the number of parameters in the request is chosen to provide targeted information allowing DNS resolutions previously required by a terminal or a terminal application to be detected, depending on the application protocol, depending on the transport protocol, etc.).

According to another particular embodiment of the invention, the invention is also applicable to a fixed or mobile access network implemented using the CGN equipment (CGN standing for Carrier Grade NAT). The method is the same as the one described with reference to FIG. 2. Specifically, the CGN equipment may incorporate a DNS cache that operates identically to the one presented above. Therefore, the same method may be employed. On each new detected flow or IP request, a request, for example a "Whois Lookup", may be sent by the module for processing IP traffic of the CGN equipment, i.e. the module N, to the DNS cache CR of the CGN equipment (the number of parameters in the request is chosen to provide targeted information allowing DNS resolutions previously required by a terminal or a terminal application to be detected, depending on the application protocol, depending on the transport protocol, etc.).

The invention claimed is:

1. A method for providing a notification, by a notification-providing device, of use by at least one terminal, of an uncertified domain name server, the method comprising:
   receiving a request from said at least one terminal, said request comprising at least one parameter corresponding to a first address allowing communication with a server;
   obtaining a first list comprising at least one address from at least one certified domain name server of an Internet service provider of the at least one terminal;
   searching for said first address in the first list;
   depending on a result of the searching for said first address, determining that said at least one terminal requested a domain name server resolution from a domain name server that is not a certified domain name server of the Internet service provider of the at least one terminal; and
   providing a notification, depending on the result of the searching, to said at least one terminal of said at least one terminal retrieving the first address from an uncertified domain name server.

2. The method as claimed in claim 1, wherein the searching and notification-providing are conditional on a result of a second step of searching for said at least one first address in a second list, said second list comprising destination addresses of the requests sent by said at least one terminal.

3. The method as claimed in claim 1, wherein the searching further comprises searching for a second address associated with said first address in said first list, said second address being a parameter of said request and corresponding to an address of said at least one terminal, said first list comprising at least one address of said at least one terminal, which at least one address is obtained from said at least one terminal, said at least one address being associated with at least one address obtained from said at least one certified domain name server.

4. The method of claim 1, wherein the searching further comprises searching for at least one communication-port number associated with said address in said first list, said at least one communication-port number corresponding to a parameter of said request, said first list comprising at least one communication-port number obtained from said at least one terminal associated with at least one address obtained from said at least one certified domain name server.

5. The method as claimed in claim 1, wherein the notification-providing comprises a redirection of said request to at least one Internet page.

6. The method as claimed in claim 1, wherein the notification-providing comprises sending a message to said at least one terminal.

7. The method as claimed in claim 1, wherein the notification-providing comprises sending a message to a help desk.

8. The method as claimed in claim 1, wherein the notification-providing is followed by filtering requests originating from said at least one terminal.

9. The method as claimed in claim 1, wherein the notification-providing is followed by modifying requests sent by said at least one terminal.

10. The method as claimed in claim 1, wherein the at least one address in the first list comprises at least one domain name server (DNS) resolution address.

11. A device for providing a notification of use by a first terminal of an uncertified domain name server, and wherein the device comprises:

at least one processor; and at least one non-transitory computer readable medium comprising instructions stored thereon which when executed by the at least one processor configure the device to:

receive a request from said first terminal, said request comprising at least one parameter corresponding to a first address allowing communication with a server;

obtain a first list comprising at least one address from at least one certified domain name server of an Internet service provider of the at least one terminal;

search for said first address in the first list;

depending on a result of the searching for said first address, determine that said at least one terminal requested a domain name server resolution from a domain name server that is not a certified domain name server of the Internet service provider of the at least one terminal; and provide a notification, depending on the result of the search, to said first terminal of said first terminal retrieving the first address from an uncertified domain name server.

12. A gateway comprising the device recited in claim 11.

13. A server comprising the device recited in claim 11.

14. The first terminal comprising the device recited in claim 11.

15. A non-transitory computer-readable medium comprising a computer program stored thereon comprising instructions for implementing method for providing a notification of use by at least one terminal of an uncertified domain name server when the program is executed by a processor of a device, the method comprising:

receiving a request from said at least one terminal, said request comprising at least one parameter corresponding to a first address allowing communication with a server;

obtaining a first list comprising at least one address from at least one certified domain name server of an Internet service provider of the at least one terminal;

searching for said first address in the first list;

depending on a result of the searching for said first address, determining that said at least one terminal requested a domain name server resolution from a domain name server that is not a certified domain name server of the Internet service provider of the at least one terminal; and providing notification, depending on the result of the searching, to said at least one terminal of said at least one terminal retrieving the first address from an uncertified domain name server.

* * * * *